United States Patent [19]

Vroom

[11] 4,020,499
[45] Apr. 26, 1977

[54] APPARATUS FOR CONTROLLING DRIVE TO PRESSURE ROLLERS IN A CAMERA WITH ELECTRIC MOTOR DRIVE

[75] Inventor: Clifford G. Vroom, Rochester, N.Y.

[73] Assignee: Eastman Kodak Company, Rochester, N.Y.

[22] Filed: Mar. 1, 1976

[21] Appl. No.: 662,307

[52] U.S. Cl. .............................. 354/86; 354/173; 354/212

[51] Int. Cl.² ...................................... G03B 17/50

[58] Field of Search ............... 354/83, 85, 86, 173, 354/212, 202

[56] References Cited

UNITED STATES PATENTS

| | | | |
|---|---|---|---|
| 2,232,240 | 2/1941 | Jones | 354/173 |
| 3,641,412 | 2/1972 | Hayashi | 318/470 |
| 3,714,879 | 2/1973 | Land et al. | 354/83 |
| 3,889,280 | 6/1975 | Biber | 354/83 |
| 3,906,527 | 9/1975 | Erlichman | 354/85 |
| 3,946,410 | 3/1976 | Maida | 354/173 |

*Primary Examiner*—Richard L. Moses
*Attorney, Agent, or Firm*—N. Rushefsky

[57] ABSTRACT

In the removal of a film unit from a motor-assisted self-processing camera, the number of rotations per unit time of the pressure rollers which accomplish such removal is controlled by providing electrical contacts in association with a star wheel and a motor. The star wheel includes electrically conductive and nonconductive portions arranged so that the angular orientation of the star wheel relative to the electrical contacts determines whether or not current will be furnished from a battery to the motor. An orbiting pin, synchronized with the rotation of the pressure rollers, advances the star wheel through a portion of a cycle for each complete revolution of the pin. After a desired number of revolutions of the orbiting pin, the star wheel completes a full cycle and returns to an end-of-cycle position in which position current to the motor is removed and the motor dynamically braked. Drive to the pressure rollers commences with the return of the shutter release after exposure of a film unit. A mechanism, energized by the depression of the shutter release nudges the star wheel mechanically off of its end-of-cycle position to permit electric current to flow from the battery to the motor.

5 Claims, 3 Drawing Figures

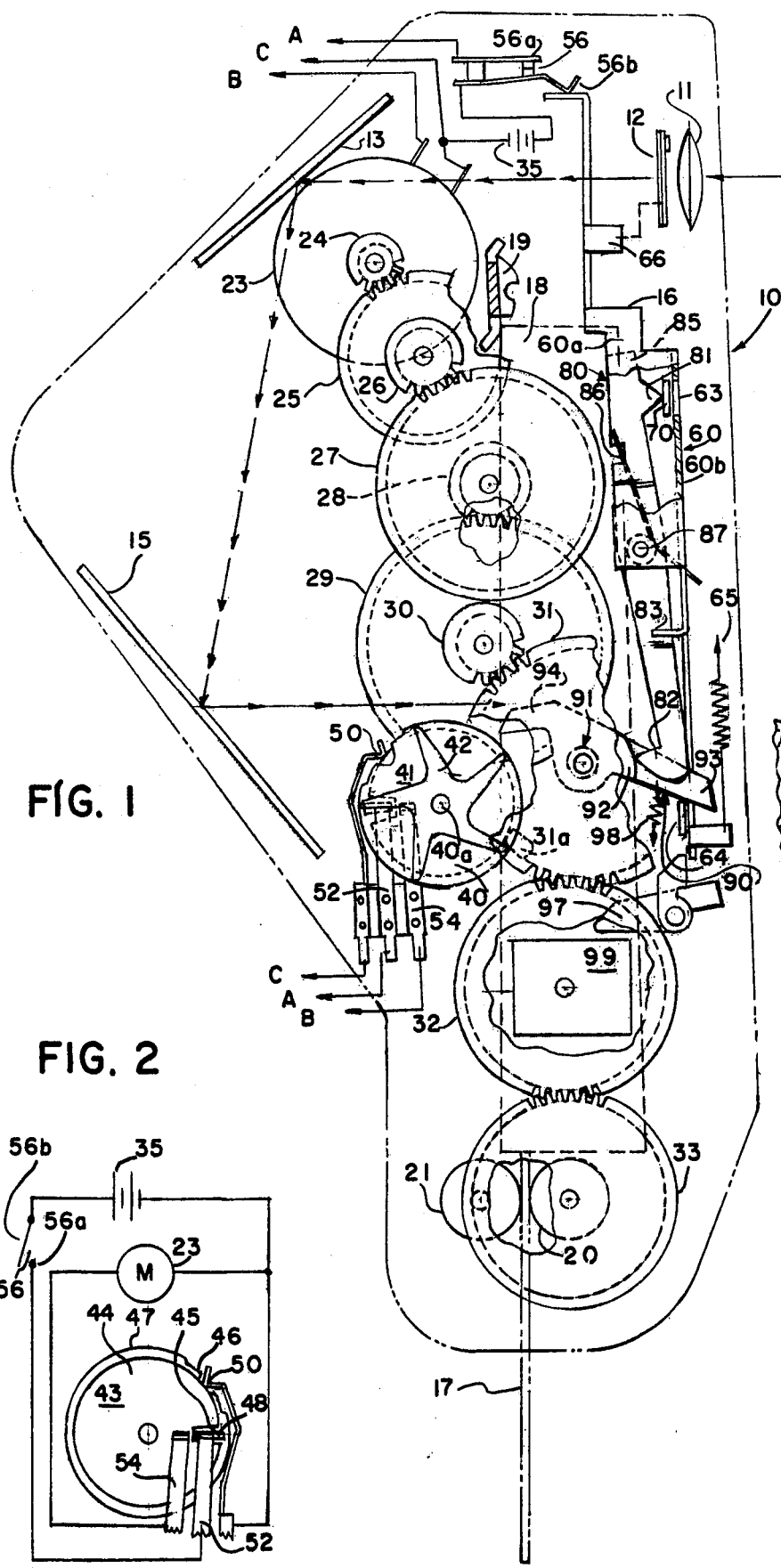
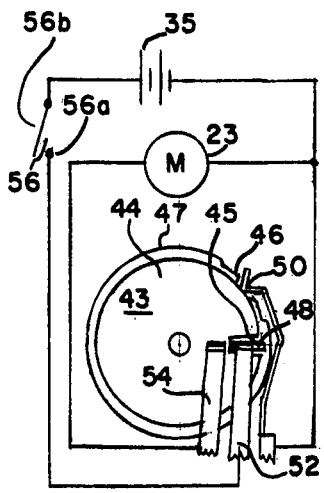
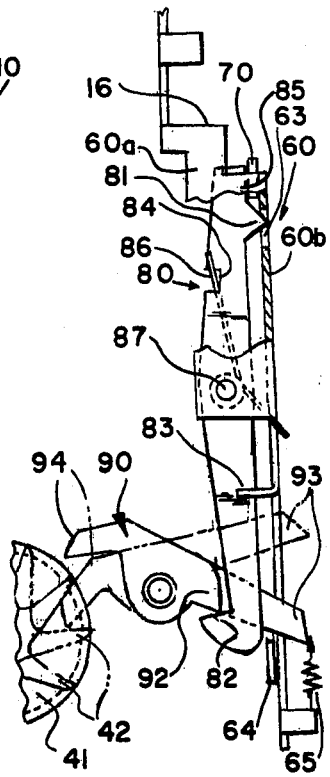
FIG. 1
FIG. 2
FIG. 3

APPARATUS FOR CONTROLLING DRIVE TO PRESSURE ROLLERS IN A CAMERA WITH ELECTRIC MOTOR DRIVE

BACKGROUND OF THE INVENTION

1. Field Of The Invention

The present invention relates generally to self-processing cameras. In the use of such a camera a film cartridge containing a plurality of film units is inserted into the camera. After exposure of a film unit in the camera, the film unit is transported between the nip of a pair of pressure rollers to release processing solution stored with such film unit and deposit the solution uniformly over the surface of the exposed area of the film unit. To automate the processing of the exposed film unit, the camera may include a battery-powered motor that is used in combination with suitable gearing to drive the pressure rollers and to actuate a picker device to feed the film unit into the roller nip. In such a camera it is important that the pressure rollers rotate through a sufficient number of revolutions to ensure uniform processing of the film unit. It is therefore desirable to provide in a camera means which ensures that a sufficient number of revolutions of the pressure rollers in a given time will be effected in transporting each film unit to thereby permit proper processing of the film unit.

2. Description Relative To The Prior Art

From U.S. Pat. No. 3,641,412 it is known that the amount of paper dispensed from a motor-assisted paper-dispensing apparatus may be controlled by an arrangement that includes a gear, having electrically conductive and nonconductive portions, and a stationary electrical contact that wipes against such gear to thereby determine whether or not current from a battery will be delivered to the motor via an electric circuit that includes the gear and the contact. When the apparatus is not in use the gear is at rest and the electrical contact is engaged with the insulated portion of the gear. To initiate the dispensing of paper from this apparatus, the patent suggests that a parallel electric circuit be provided between the motor and the battery to commence rotation of the gear drive to the paper feed and to thereby also rotate the gear which is mechanically coupled to this gear drive. The parallel circuit is effected by depressing a button on the apparatus, which causes the closing of secondary electrical contacts during the period for which the button is depressed. The button, however, must be depressed for a time sufficient to enable the gear to be rotated at least through a sufficient extent to permit the stationary contact to engage the conductive portion of the gear. While the apparatus described in the prior art may be suitable for a paper dispenser it is not particularly suitable for use in an automatic self-processing camera. It is preferred in such a camera to have movement of the shutter release initiate exposure, processing and removal of the film unit from the camera. It would be undesirable in such a camera to require that the photographer maintain pressure upon the shutter release member for any time greater than the very minimum needed to trip the shutter.

It is an object of the invention to provide in a self-processing camera improved means for controlling the drive to a pressure roller which means controls the number of revolutions of the pressure roller when effecting processing of an exposed film unit.

It is a further object of the invention to provide in a self-processing camera an improved means for controlling the drive to a pressure roller which means is actuatable after exposure of a film unit without the need for the photographer to maintain pressure on the shutter release button for any length of time greater than that needed to expose the film unit.

Briefly, the foregoing and other objects are accomplished by providing in a self-processing camera, which includes an electric motor and a drive which couples the motor to a pressure roller, an improved control for controlling electric current to the motor, which control includes a rotatable star wheel that is rotated incrementally through a cycle so that one complete revolution of the star wheel is associated with a desired number of rotations of the processing roller. The angular orientation of the star wheel relative to electrical contacts determines whether or not current will be furnished to the motor. In order to automatically commence cycling of the star wheel and therefore the furnishing of electric current to the motor the improved control means further includes a means for mechanically nudging the star wheel from an end-of-cycle position in which no current is furnished to the motor to an angular orientation in which electric current may be furnished to the motor. The star wheel nudging means is made cooperable with the camera's shutter release member so that the star wheel is nudged after exposure of the film unit and with the return of the shutter release member to a retracted position.

As used herein the term "star wheel" refers to a rotatable member which includes a plurality of teeth or other projections located radially about the center of rotation of the member and which teeth or projections are adapted to be periodically struck by an element or elements associated with the drive of the camera's motor to thereby rotate the star wheel through a cycle. Contrary to the teachings of U.S. Pat. No. 3,641,412 the star wheel in accordance with the invention described herein is not rigidly coupled to a motor drive. Rather, the star wheel is permitted to have s significant play in angular orientation to enable it to be mechanically nudged from its end-of-cycle orientation.

Various means for practicing the invention and other advantages and novel features thereof will be apparent from the detailed description of the preferred embodiment of the invention presented below.

BRIEF DESCRIPTION OF THE DRAWINGS

In the detailed description of the preferred embodiment of the invention presented below, reference is made to the accompanying drawings wherein like reference numerals denote like elements and wherein:

FIG. 1 is a representation partially in schematic form depicting a right side elevational view of one embodiment of an automatic self-processing camera made in accordance with the teachings of the invention. This figure also includes elements of an electrical circuit that cooperate with the illustrated mechanical portions of the camera. Letters associated with the electrical circuit are used to indicate commonly connected points.

FIG. 2 is a schematic of the electrical circuit shown in FIG. 1 and showing additional details of a preferred form of star wheel.

FIG. 3 represents an enlarged view of a portion of the camera shown in FIG. 1.

DESCRIPTION OF THE PREFERRED EMBODIMENT

Referring now to the drawings and in particular to FIG. 1 there is shown a self-processing camera 10 which includes a lens 11, a conventional exposure control element including a shutter 12, first and second mirrors 13 and 15 respectively, for increasing the effective focal length of the camera and directing the image onto a self-processing film unit 17 stored with other similar film units in a cartridge 18. The camera's shutter release button 16 may be mechanically coupled to the shutter by suitable conventional means and upon depression of the former, the shutter is opened to admit an appropriate amount of light to properly expose the film unit. As is known in conventional self-processing cameras, after exposure of the film unit, a picker device 19 is actuated to transport the film unit into the nip of a pair of driven pressure rollers, 20, 21 which remove the film unit from the camera and while doing so maintain a uniform flow of processing solution across the image area of the film unit to thereby process same. To drive the pressure rollers, the camera includes a constant speed motor 23 and suitable gears 24-23 which transmit drive from the motor to the pressure roller 20. The motor 23 may in turn receive its energy from a battery 35.

To control the duration and timing of the drive to the pressure roller 20, the camera 10 includes a star wheel 40 that is rotatively supported upon a pin 40a that is secured to the frame of the camera. The star wheel comprises a first side 41 which includes a multiple number, in this instance five, of generally radially directed arms 42 which are raised from the otherwise planar surface of side 41. The opposite side 43 of star wheel 40 (see FIG. 2) includes upon the surface thereof a generally circular metallic plate 44 of diameter slightly less than that of the star wheel. The star wheel, but for the metallic plate, is made of a nonconducting plastic composition. A notch 45 is formed in the periphery of the metallic plate 44 to expose the plastic surface of side 43. A notch 46 is also formed along the edge 47 of the plastic portion of the star wheel. This latter notch is of a depth at least equal to the difference in distance between the edge of the plastic portion of the star wheel and the metallic plate to provide in effect, an access to the metallic plate for an electrical contact 50 which is stationarily supported to ride along the star wheel edge 47 during rotation of the star wheel. In addition to electrical contact 50, there are two other electrical contacts, 52 and 54, which are associated with the surface of side 43 of the star wheel. Both of these latter contacts lie generally parallel with this surface and have portions thereof that are spring biased to ride upon the surface as the star wheel is rotated. These contacts are offset from each other in the radial direction of the star wheel. Contact 52 is supported so that in one orientation of the star wheel the contact is located within the plastic portion uncovered by notch 45. In this orientation of the star wheel, contact 52 will be electrically isolated from the other contact 54. At other angular orientations of the star wheel the two contacts 52 and 54 are so located relative to each other and the star wheel that they ride along the surface of the metallic plate 44 and are therefore, in this latter orientation, electrically coupled.

The initial position, which is also an end-of-cycle position, of the star wheel is shown in FIGS. 1 and 2. This position corresponds to the position of the various elements as they appear prior to depression of the shutter release button 16. A switch 56 couples the positive terminal of the battery 35 to contact 52. Switch 56 is comprised of a stationary contact 56a coupled directly to the battery and a movable contact 56b that is responsive to the movement of a plate 60 to which the shutter release button 16 is secured. The switch 56 is closed when the shutter release button 16 is not in a depressed position. Movable contact 56b is directly connected (see A—A in FIG. 1) to contact 52. Electrical contact 52 is seated in a niche 48 molded in the plastic exposed by the notch 45 on the metal plate 44. The contact 52 is in this position electrically isolated from contact 54 which always is in contact with the metal plate 44. The function of the niche 48 is, to cooperate with the spring like contact 52 when it is seated in the niche so as to provide some resistance against undesired rotation of the star wheel by minor forces such as might occur for example if the camera were jarred. Electrical contact 54 is directly coupled (note B—B FIG. 1) to one pole of the electric motor 23. The second pole of the electric motor is directly coupled to the negative terminal of the battery. In the initial position, electrical contact 50 resides in the notch 46 so as to contact an edge of plate 44 and thereby cooperates with the plate 44 and the contact 54 to provide a short circuit about the poles of the motor. The purpose of this short circuit will be described later with reference to the operation of the camera.

As indicated previously, the shutter release button 16 is connected to an upstanding plate 60 which is located adjacent the front of the camera. The left side of the plate (as viewed from the front of the camera) is bent about the illustrated right side of the camera so as to provide a portion 60a of the plate that is parallel with the camera's right side and a portion 60b which is parallel with the front face of the camera. The plate portion 60b may include winged portions (not shown) which ride beneath overlapping rail portions formed in a slot in the frame to guide the plate for movement in the up and down directions only. A spring 65 between the frame of the camera and a lug formed in the plate biases the plate upwardly. The plate portion 60b includes a slot 63 which, when the plate is in its upwardmost position, is located directly in front of a ledge 70. The ledge is essentially a lug that is located at the illustrated upper right edge of the front of the camera. When viewed from the front of the camera the ledge extends from the frame of the camera towards the left. Supported against the rear surface of the ledge 70 is a nose portion 81 of a hook member 80. The frontwardly facing nose portion is located adjacent the upper end of the longitudinally extending hook member with a hook portion 82 thereof located at the bottom end of the hook member and facing rearwardly. As indicated by the shading lines drawn on the hook member 80 there are two folds formed at about the one third points of the hook member 80 so that the hook member comprises three plateau like portions with the hook portion being closer to a viewer of FIG. 1 and the nose portion being furthest from such viewer. One end of a spring 86 is located in a notch 84 formed in the rearwardly facing edge of the hook member. This spring is wound about a pin 87 which pivotably couples the hook member to the plate portion 60a. The spring 86 serves to bias the hook member in the clock-wise direction. Depending from the plate 60 is a bifurcated fork-like member 83 whose legs, like the hook portion 82, are bent rearwardly to thereby straddle the hook member 80.

The next portion of the apparatus is the nudger 90 which may be an integrally molded plastic member that includes three operative portions in addition to a center portion which is used to pivotably mount the nudger upon the same axle as that to which gear 31 is mounted. Although mounted upon the same axle, nudger 90 and gear 31 are rotatable independently of each other. Extending frontwardly from the center portion 91 of the nudger 90 are two arms 92 and 93. Arm 93 is significantly longer than and located—to a viewer of FIG. 1—behind appendage or arm 92. A spring 98 is attached to arm 93 and this spring being also attached to the frame biases the nudger in a clockwise direction. A lug 64 formed on the frame serves as a stop and arm 93 abuts against this lug because of the bias of spring 98. A third radial arm 94 extends rearwardly from the nudger center portion 91 and this arm is sufficiently long to extend beyond the outward portions of the star wheel arms 42 so as to be able to strike the side portion of one of such arms 42 while such arm 42 is generally forwardly facing.

As mentioned previously gear 31 and nudger 90 are supported for rotation about the same axle. Gear 31—to a viewer of FIG. 1—is located in front of the nudger. A pin 31a is formed on the underside of gear 31 near the periphery thereof and this pin is located relative to the star wheel so as to be able to strike an arm 42 of the star wheel as the pin orbits while the gear is rotated.

The operation of the embodiment shown in FIGS. 1 through 3 will now be described. To expose a film unit, the operator depresses shutter release member 16. A finger 66 on plate 60 cooperates with suitable linkage to actuate the shutter and other exposure control devices when the shutter release member is depressed. Movement of the shutter release member downwardly also similarly moves the plate 60 and hook member 80. The ledge 70 is sufficiently long for the nose portion 81 to continue to abut against the ledge as the hook member 80 is moved through a portion of its downward travel. However, a point is reached where the nose portion 81 finally falls off of the ledge 70 and the hook member is free to pivot clockwise under the influence of spring 86. The pivotal movement permits hook portion 82 to catch the underside of appendage 92 of the nudger member (see FIG. 3). It will be noted that because of the desire for compactness of the camera the plate portion 60b is not very far from the nose portion 81 of the hook member. Therefore, were it not for slot 63, the extent to which hook member 80 would be able to pivot would be very limited. The slot 63 permits the nose portion 81 to pivot and seat within the slot and thereby permits the needed pivoting movement for the hook portion 82 to catch nudger appendage 92. It will be also be noted from FIG. 3 that a flat extension 85 above nose 81 abuts against the rearward surface of ledge 70 when the nose is seated in the slot 63. This ensures that the hook member 70 will not be caught beneath the bottom edge of ledge 70 which could occur if this extension were not present. When the operator releases the depressed shutter release member 16, spring 65, which was energized during the movement downward of the shutter release member, restores the shutter release member 16 and plate 60 to their upward position. Upward movement of plate 60 forces the hook member 80 also to move upwardly. Because of the cooperation of ledge 70 and nose portion 81 the hook member is forced to also pivot as it is moved upwardly. Thus, the hook portion 82 is simultaneously moving upward against nudger appendage 92 and pivoting counterclockwise off of the nudger as the nudger itself pivots about its center portion 91 in response to the upward movement of the hook member. Counterclockwise pivoting of arm 94 of the nudger forces it against an arm 42 of the star wheel and the star wheel is nudged into an angular orientation in which both electrical contacts 52 and 54 are in contact with the metal plate 44, of the star wheel. In addition, electrical contact 50 is moved out of notch 46 so that it now rests against the non-conducting edge 47 of the star wheel. In the position just described, an electrical circuit is almost now completed between the battery, electrical contacts 52 and 54 and the motor. With the complete return of the shutter release member 16 to its upwardmost position, switch 56 will be closed and the circuit complete between the battery and the motor. The furnishing of electrical current to the motor drives the motor which in turn drives gears 24 through 33 and, in turn, pressure roller 20. It can be seen therefore, that the motor can only be energized after the exposure of the film unit has taken place. A picker 19 which is mechanically coupled to a single revolution clutch 99 delivers the film unit into the nip between pressure rollers 20 and 21. After one revolution of the gear 32, the clutch is disengaged by a clutch release finger 97 with the picker unit located back in its initial position. The clutch may be of the kind described in U.S. Pat. No. 3,810,210 or may assume other forms. Gear 31 is so designed that when driven it will rotate approximately once for each revolution of pressure roller 20. With each rotation of gear 31, the pin 31a will strike against an arm 42 of the star wheel and the star wheel will thus be incrementally advanced by the pin through a cycle. The configuration of the star wheel shown in FIG. 1 is a particularly desirable one. In this configuration the arms 42 are formed so that the rear portion thereof which is to be struck by the pin 31a, is substantially radially directed. This permits a maximum of contact time between the pin 31a and the arm 42 and thus the star wheel will be smoothly carried through an increment of a cycle rather than being jolted through such increment. After five rotations of the gear 31 in a time period determined by the speed of the motor, the contact 52 moves into the notch 45, opening the circuit between the battery and the motor. The opening of the circuit will stop the motor and cease the drive to the gearing; however, in certain circumstances, for example, where the inertia of the gear drive is relatively high, it is possible that the inertia of the gears will cause them to continue to rotate. To offset the effect of inertia, dynamic braking is used. As will be recalled from the discussion above, the electrical contact 50, when seated in notch 46, provides a short circuit about the poles of the motor. It is known that the shorting of the leads across a coasting motor will in effect provide a braking that will immediately stop the motor and the gearing associated with the motor. To avoid providing a short circuit of the battery as well, the electrical contact 50 is located so as to make contact with plate 44 when seated in notch 46 slightly after electrical contact 52 has ceased contact with plate 44 by entering notch 45.

It will be appreciated, therefore, that with the improved apparatus of the invention the pressure roller 20, which is coupled to the gearing, and the freely rotatable pressure roller 21 are automatically rotated through a controlled number of turns in a desired time period to uniformly process a film unit. To permit cleaning of the pressure rollers, the rollers and gear 33 may be mounted on an assembly which permits gear 33 to pivot out of engagement with gear 32.

The invention has been described with particular reference to a preferred embodiment thereof, but it will be understood that variations and modifications can be effected within the spirit and scope of the invention.

I claim:

1. In a camera for effecting exposure and processing of a self-processable film unit, the camera including a shutter for exposing the film unit, a movable shutter release member for actuating the shutter, means for restoring the shutter release member to an initial position after movement of the member to actuate the shutter, a pair of opposed pressure members at least one of which is a roller for removing the exposed film unit from the camera, an electric motor, drive means coupling the motor to the roller for drivingly rotating the roller, and control means for controlling electric current to the motor, the improvement wherein the control means comprises:

a star wheel;
means for rotatively supporting the star wheel;
means for rotating the star wheel incrementally through a cycle, the star wheel rotating means also being coupled with the drive means so that one complete revolution of the star wheel is associated with a desired number of rotations of the roller;
means cooperating with the star wheel for selectively furnishing electric current to the motor in accordance with the angular orientation of the star wheel; and
means for mechanically nudging the star wheel from an end-of-cycle position in which position no electric current is furnished to the motor to an angular orientation in which electric current may be furnished to the motor, the nudging means being cooperable with the shutter release member so as to nudge the star wheel from its end-of-cycle position during return of the shutter release member to its initial position.

2. The structure set forth in claim 1 wherein the star wheel includes two oppositely facing sides, one of said sides includes a plurality of generally radially directed arms and the other of said sides includes an electrically conductive portion and an electrically nonconductive portion; and wherein the means for furnishing electric current to the motor includes an electrical contact that is located so as to contact either the conductive or nonconductive portion, the portion contacted at any one particular moment being dependent upon the angular orientation of the star wheel.

3. The structure set forth in claim 1 wherein the nudging means comprises a nudger member, the nudger member includes a first arm supported so as to extend towards the star wheel and adapted to engage the star wheel to rotate the star wheel from its end-of-cycle position and the nudger member further includes a second arm;

means for supporting the nudger member for pivotal movement; and means for engaging the second arm in response to the return movement of the shutter release member towards its initial position to thereby cause the first arm to engage the star wheel and nudge the star wheel from its end-of-cycle position.

4. In a camera for effecting exposure and processing of a self-processable film unit the camera including a shutter for exposing the film unit, a movable shutter release member for actuating the shutter, means for restoring the shutter release member to an initial position after movement of the member to actuate the shutter, a pair of opposed pressure members at least one of which is a roller for removing the exposed film unit from the camera, an electric motor, drive means coupling the motor to the roller for drivingly rotating the roller, and control means for controlling electric current to the motor, the improvement wherein the control means comprises:

a rotatable member having a plurality of projections formed radially about the member;
means for rotatively supporting the rotatable member;
an orbiting pin driven by the drive means and adapted to engage a projection on the rotatable member during a portion of each orbit of the pin, such engagement advancing the rotatable member through an incremental portion of a cycle;
means cooperating with the rotatable member for selectively furnishing electric current to the motor in accordance with the angular orientation of the rotatable member;
means for mechanically nudging the rotatable member from an end-of-cycle position in which position no electric current is furnished to the motor to an angular orientation in which electric current may be furnished to the motor, the nudging means including a first pivotable member having an arm engageable with the rotatable member to pivot the rotatable member from the end-of-cycle position; and
a second pivotable member, coupled to the shutter release member for pivoting the first pivotable member during return movement of the shutter release member to its initial position.

5. The structure of claim 4 wherein the control means includes a stationary ledge for limiting the freedom of the second pivotable member to pivot when the shutter release member is in its initial position;

the second pivotable member comprises a hook member having a hook-like element formed proximate one end thereof and a nose portion formed proximate the opposite end thereof, the nose portion being urged against the ledge when the shutter release member is in its initial position and adapted to leave the ledge at some time during movement of the shutter release member from its initial position;

spring means for biasing the hook member against the ledge when the shutter release member is in its initial position and to bias the hook member for engagement with the first pivotable member when the hook member leaves the ledge; and an appendage formed on the first pivotable member, the appendage being adapted to be engaged by the hook-like element during return movement of the shutter release member.

* * * * *

UNITED STATES PATENT OFFICE
CERTIFICATE OF CORRECTION

PATENT NO. : 4,020,499
DATED : April 26, 1977
INVENTOR(S) : Clifford G. Vroom

It is certified that error appears in the above-identified patent and that said Letters Patent are hereby corrected as shown below:

Column 3, line 24, "24-23" should read --24-33--.

Signed and Sealed this nineteenth Day of July 1977

[SEAL]

Attest:

RUTH C. MASON
Attesting Officer

C. MARSHALL DANN
Commissioner of Patents and Trademarks